(12) United States Patent
Namuduri et al.

(10) Patent No.: US 10,293,805 B2
(45) Date of Patent: May 21, 2019

(54) GENERATOR SYSTEM AND CONTROL METHOD

(71) Applicant: GM GLOBAL TECHNOLOGY OPERATIONS LLC, Detroit, MI (US)

(72) Inventors: Chandra S. Namuduri, Troy, MI (US); Suresh Gopalakrishnan, Troy, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 0 days.

(21) Appl. No.: 15/653,060

(22) Filed: Jul. 18, 2017

(65) Prior Publication Data

US 2019/0023255 A1 Jan. 24, 2019

(51) Int. Cl.
| | |
|---|---|
| *B60W 20/10* | (2016.01) |
| *B60W 10/10* | (2012.01) |
| *B60W 10/02* | (2006.01) |
| *B60W 10/08* | (2006.01) |
| *B60W 10/06* | (2006.01) |
| *H02J 7/14* | (2006.01) |

(52) U.S. Cl.
CPC .......... *B60W 20/10* (2013.01); *B60W 10/023* (2013.01); *B60W 10/06* (2013.01); *B60W 10/08* (2013.01); *B60W 10/10* (2013.01); *H02J 7/1476* (2013.01); *B60W 2540/10* (2013.01); *B60W 2540/12* (2013.01); *B60W 2710/024* (2013.01); *B60W 2710/0644* (2013.01); *B60W 2710/0666* (2013.01); *B60W 2710/081* (2013.01); *B60W 2710/083* (2013.01); *B60W 2710/086* (2013.01); *B60W 2710/1005* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 6,492,785 | B1 * | 12/2002 | Kasten | B60K 6/26 180/165 |
| 7,009,365 | B1 | 3/2006 | Namuduri et al. | |
| 7,290,525 | B1 | 11/2007 | Kapsokavathis et al. | |
| 7,797,096 | B2 | 9/2010 | Reynolds et al. | |
| 9,387,766 | B2 | 7/2016 | Hao et al. | |
| 2003/0030395 | A1 * | 2/2003 | Hampo | H02P 6/08 318/432 |

(Continued)

*Primary Examiner* — Lail A Kleinman
*Assistant Examiner* — Mahmoud M Kazimi
(74) *Attorney, Agent, or Firm* — Quinn IP Law

(57) ABSTRACT

A system includes an engine, a generator assembly, a direct current voltage bus, and a controller. The assembly is coupled to and driven via the engine, and has an electric generator, field windings, and a voltage rectifier collectively producing a generator output voltage. An inner control loop of the controller provides a field duty cycle signal to the field windings in response to an adjusted voltage control signal. An outer control loop of the controller provides a torque-based voltage control signal as an input to the inner control loop in response to a commanded engine torque and an estimated generator torque. An output torque of the generator is directly controlled via the outer control loop. The inner control loop calculates the adjusted voltage control signal as a difference between the torque-based voltage control signal and the output voltage.

19 Claims, 2 Drawing Sheets

(56) References Cited

U.S. PATENT DOCUMENTS

| | | | | |
|---|---|---|---|---|
| 2003/0042876 | A1* | 3/2003 | Ikeda | H02P 9/006 |
| | | | | 322/37 |
| 2003/0062206 | A1* | 4/2003 | Fujikawa | B60K 6/383 |
| | | | | 180/65.25 |
| 2004/0235614 | A1* | 11/2004 | Tajima | B60K 6/485 |
| | | | | 477/3 |
| 2008/0054646 | A1* | 3/2008 | Reynolds | H02P 9/04 |
| | | | | 290/400 |
| 2012/0259570 | A1* | 10/2012 | Zhang | B60W 10/08 |
| | | | | 702/65 |
| 2013/0134918 | A1* | 5/2013 | Richards | H02P 25/03 |
| | | | | 318/490 |
| 2013/0197780 | A1* | 8/2013 | Oehlerking | B60K 6/46 |
| | | | | 701/102 |
| 2015/0197234 | A1* | 7/2015 | Liang | B60L 15/20 |
| | | | | 701/22 |

* cited by examiner

GENERATOR SYSTEM AND CONTROL METHOD

INTRODUCTION

Vehicles, power plants, and other power generation systems often include an internal combustion engine and an engine-driven electric generator. Mechanical energy generated via the engine's fuel combustion process is converted to electrical energy by operation of the electric generator, with the generated electricity thereafter used to recharge an energy storage system or directly power a host of electrical components, such as auxiliary motors, lights, gauges, and power accessories. A voltage rectifier outputs a direct current generator output voltage in response to controller-originated electrical control signals.

SUMMARY

Disclosed herein are an engine-driven generator system and a related control method. In a hybrid control system, for instance, an electric generator acts as an actuator in a manner that ultimately affects engine torque at the engine's crankshaft. Thus, precise control over generator output torque may be required in order to ensure optimal control over engine torque. The present approach is intended to facilitate such control to within a relatively high degree of accuracy, e.g., ±5 percent or ±1-2 Nm at the crankshaft.

The present method is executed within programmed internal logic of an engine control module (ECM) or other designated controller to enable direct control over the generator output torque while maintaining a generator voltage within predetermined operating condition-specific limits. The system and method differ from existing approaches that seek to vary a generator's voltage set point based on ambient temperature, battery state-of-charge, and other dynamically changing factors without directly acting on the generator output torque. By virtue of providing for direct control of the generator's output torque, energy recuperation may be maximized, particularly during certain application-specific operating modes such as vehicle coasting and braking maneuvers in an exemplary motor vehicle application.

In particular, the present method uses inner and outer control loops while maintaining the generator output voltage within predetermined voltage limits, e.g., between 12.5 and 15.5 VDC. The method feeds temperature-independent parameters into a torque estimation model. In real-time operation, the disclosed approach requires a minimum set of measured data at a single temperature as explained herein, such that a torque-based voltage control signal provided as an input to the inner control loop described herein is independent of the temperature of the disclosed system or the surrounding ambient. The system also preserves a voltage control mode when needed, such as for charging a battery. In this manner, mode-specific torque control operations may be implemented during the vehicle coasting and braking maneuvers as noted above, or during other operations depending on the application.

In an example embodiment, an engine-driven generator system includes an internal combustion engine, a generator assembly, a direct current (DC) voltage bus, and a controller. The generator assembly is coupled to and driven via the engine, and includes an electric generator, field windings, and a voltage rectifier collectively producing a DC generator output voltage. The DC voltage bus is connected to the voltage rectifier and has an electrical potential that is equal to the DC generator output voltage.

The controller has an inner control loop that is configured to provide a field duty cycle (FDC) signal to polyphase field windings of the electric generator in response to an adjusted voltage control signal, and an outer control loop commanding a torque-based voltage control signal as an input to the inner control loop in response to a commanded engine torque and an estimated generator torque. An output torque of the electric generator is directly controlled via operation of the outer control loop. The inner control loop is configured to calculate the adjusted voltage control signal as a difference between the torque-based voltage control signal and the output voltage of the DC bus.

A method for controlling an engine-driven generator system is also disclosed. In a possible embodiment, the method includes commanding, via an outer control loop of the controller, a torque-based voltage control signal as an input to an inner control loop of the controller in response to a commanded engine torque and an estimated generator torque. The method also includes calculating an adjusted voltage control signal via the inner control loop of the controller as a difference between the torque-based voltage control signal and an output voltage of the electric generator. Thereafter, the method includes commanding, via the inner control loop of the controller, a field duty cycle signal to field windings of the electric generator in response to the adjusted voltage control signal. The output torque of the electric generator is directly controlled via operation of the outer control loop as part of the method, e.g., selectively in some embodiments during predetermined operating modes such as vehicle coasting and braking.

The above features and advantages and other features and advantages of the present disclosure are readily apparent from the following detailed description of the best modes for carrying out the disclosure when taken in connection with the accompanying drawings.

Figure 1:
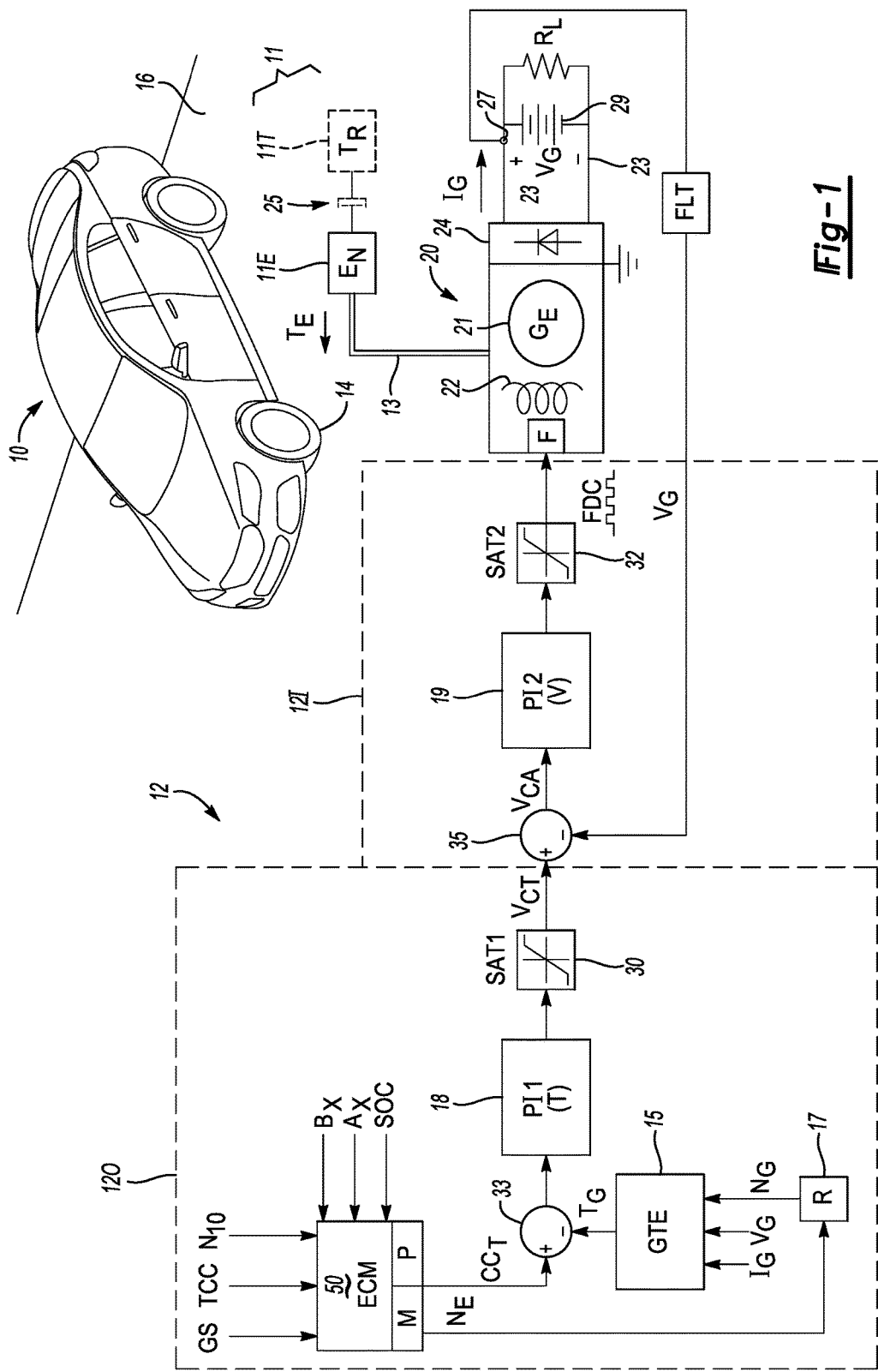
FIG. 1 is a schematic illustration of a vehicle having an internal combustion engine, an engine-driven generator system, and a controller selectively providing direct torque control over a generator of the engine-driven generator system.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is intended to cover modifications, equivalents, combinations, or alternatives falling within the spirit and scope of the disclosure as defined by the appended claims.

DETAILED DESCRIPTION

Referring to the drawings, wherein like reference numbers refer to like components throughout the several views, FIG. 1 depicts a schematic example motor vehicle 10 having road wheels 14 in rolling contact with a road surface 16. While various vehicular and non-vehicular embodiments may be envisioned, the motor vehicle 10 will be described hereinafter as a non-limiting example application for an engine-driven generator system 12 configured as described herein.

The engine-driven generator system 12 includes a powertrain 11 having an internal combustion engine (EN) 11E and an engine-driven generator assembly 20, with the engine 11E coupled and delivering engine torque (arrow $T_E$) to an electric generator (GE) 21 of the generator assembly 20. The engine torque (arrow $T_E$) causes the electric generator 21 to rotate and thereby produce a DC generator output voltage ($V_G$) via a voltage rectifier 24, resulting in a generator output current (arrow $I_G$). The engine 11E may be mechanically coupled to the generator 21, for instance via a belt system 13 or other suitable connections, such that rotation of the engine 11E is ultimately imparted to an input shaft (not shown) of the generator 21. In some embodiments the engine 11E may be fluidly coupled to a transmission ($T_R$) 11T via a hydrodynamic torque converter 25 as shown in phantom.

Further with respect to the generator assembly 20 of FIG. 1, the electric generator 21 includes a set of field windings 22 that are energized via delivery of a field duty cycle signal (arrow FDC) to a field terminal (F) of the electric generator 21. The FDC signal (arrow FDC) may be a periodic square wave signal as shown or another suitable modulated voltage control waveform that ultimately controls a voltage set point of the electric generator 21, with the voltage set point ultimately commanding the generator output voltage ($V_G$) of the generator 21.

The voltage rectifier 24, i.e., a polyphase rectifier, outputs the DC generator output voltage ($V_G$) by rectifying an alternating current (AC) voltage generated within polyphase AC windings (not shown) of the generator 21. The voltage rectifier 24 may be optionally embodied as a passive diode bridge rectifier or an active bridge rectifier using MOSFET switches, for instance. The generator output current (arrow $I_G$), for instance measured via an electrical sensor 27 located on DC voltage bus 23 on the output side of the generator 21 and processed via a suitable filter (FLT), is thereafter delivered to a connected load ($R_L$) and, if needed, stored in an energy storage device 29 for later use. The DC voltage bus 23 is connected to the voltage rectifier 24 and has an electrical potential that is equal to the generator output voltage ($V_G$).

An engine control module (ECM) 50 is in communication with the engine 11 and the engine-driven generator system 12. The ECM 50 includes a processor (P) and memory (M). The memory (M) may include tangible, non-transitory memory, e.g., read only memory, whether optical, magnetic, flash, or otherwise. The ECM 50 also includes sufficient amounts of random access memory, electrically-erasable programmable read only memory, etc., as well as a high-speed clock, analog-to-digital and digital-to-analog circuitry, and input/output circuitry and devices, as well as appropriate signal conditioning and buffer circuitry.

Further with respect to the engine-driven generator system 12 shown in FIG. 1, the electric power system 12 includes programmed control logic having separate inner and outer control loops 12I and 12O, respectively. While shown separately from the ECM 50 for illustrative clarity, in practice the inner and outer control loops 12I and 12O may be embodied as discrete logic blocks or subroutines recorded in memory (M) and executed by the processor (P) of the ECM 50.

In broad terms, the inner control loop 12I acts as a voltage control loop which ultimately determines and applies the FDC signal (arrow FDC) to the field windings 22 of the electric generator 21. As such, the inner control loop 12I may be referred to as a generator field regulator of the electric power system 12. The inner control loop 12I may be a control component of the generator assembly 20, or the inner control loop 12I may reside in logic of the ECM 50 in different embodiments. The FDC signal (arrow FDC) is applied in response to an adjusted voltage control signal ($V_{CA}$), with the inner control loop 12I configured to calculate an adjusted voltage control signal ($V_{CA}$) as the difference between the torque-based voltage control signal ($V_{CT}$) and the DC bus voltage, here the generator output voltage ($V_G$).

The outer control loop 12O, which feeds the inner control loop 12I with the torque-based voltage control signal (arrow $V_{CT}$), generally functions as a torque control loop that is selectively controlled by the ECM 50 in response to a set of system-specific input signals. Each of the respective inner and outer control loops 12I and 12O will now be described in turn with continued reference to FIG. 1.

With respect to the inner control loop 12I, a summation node/error amplifier node 35 receives the torque-based voltage control signal (arrow $V_{CT}$) and the measured generator output voltage (arrow $V_G$) from the generator assembly 20. The generator output voltage (arrow $V_G$) is measured or calculated to provide a voltage feedback term to node 35. The calculated difference in magnitude between the torque-based voltage control signal (arrow $V_{CT}$) and the generator output voltage (arrow $V_G$) on the DC voltage bus 23 downstream of the electric generator 21 is calculated at node 35 and fed forward as an error signal, i.e., the adjusted voltage control signal ($V_{CA}$), into a proportional-integral controller (PI2) 19. The controller 19 is also labeled "V" in FIG. 1 to indicate the voltage control function of the inner control loop 12I. Alternatively, the controller 19 may be embodied as a proportional-integral-derivative (PID) controller. In either embodiment, the controller 19 may be provided with "anti-windup" capabilities, such that the output of the controller 19 is not permitted to exceed predetermined limits. The inner control loop 12I may include a saturation block (SAT2) 32 configured to apply and enforce maximum and minimum voltage limits to the FDC signal (arrow FDC).

The outer control loop 12O, which may be controlled using a longer cycle time relative to a cycle time or control loop used in the control of the inner control loop 12I, includes a summation/error amplifier node 33 that receives an engine torque command (arrow $CC_T$) as an input from the ECM 50. The engine torque command (arrow $CC_T$) may be determined as a function of various system-specific inputs. For the example motor vehicle 10 of FIG. 1, such input may include engine speed (arrow $N_E$), transmission gear state (arrow GS), an applied/released torque converter clutch state (arrow TCC) of the optional torque converter 25, vehicle speed (arrow $N_{10}$), measured or reported accelerator and brake pedal position (arrows $A_X$ and $B_X$, respectively), and a state of charge of the energy storage device 29 (arrow SOC).

In addition to the engine torque command (arrow $CC_T$), the summation/error amplifier node 33 also receives a torque feedback signal (arrow $T_G$) as an estimated generator torque, with this value determined via a torque estimator logic block (GTE) 15 of the outer control loop 12O. Logic block 15 may be responsive to such inputs as the generator current (arrow $I_G$), which may be measured via the electrical sensor 27, the generator output voltage (arrow $V_G$), and the generator speed (arrow $N_G$), with the latter parameter possibly calculated by the ECM 50 as a function of engine speed (arrow $N_E$) using a calibrated belt ratio (R) 17. That is, a defined relationship exists between the engine speed (arrow $N_E$) and the generator speed ($N_G$). For a given measured or reported engine speed, the ECM 50 is therefore able to ascertain the generator speed (arrow $N_G$) by multiplying the engine speed (arrow $N_E$) by the ratio 17, and/or via lookup table. Two example approaches suitable for torque estimation are described in detail below with reference to FIGS. 2A and 2B.

The difference between the engine torque command (arrow $CC_T$) and the torque feedback signal/estimated generator torque (arrow $T_G$) determined at the summation/error amplifier node 33 is fed as an error signal into another PI controller (PI1) 18, which is also labeled with "T" in FIG. 1 to indicate the torque control function of the outer control loop 12O. The controller 18 may, as with controller 19, be provided with anti-windup capabilities, with a saturation block (SAT1) 30 enforcing maximum and minimum limits for the torque-based voltage control signal (arrow $V_{CT}$) that is ultimately used as an input to the summation/error amplifier node 35 of the inner control loop 12I.

Thus, the output of the outer control loop 12O, i.e., the torque-based voltage control signal (arrow $V_{CT}$), is a DC bus voltage command that is then received and acted on by the inner control loop 12I in generating the adjusted voltage control signal ($V_{CA}$). For that reason, use of the outer control loop 12O in the generation of the voltage set points into the inner control loop 12I may be mode-specific, i.e., the ECM 50 may determine a substitute for the torque-based voltage control signal (arrow $V_{CT}$) via reference to a lookup table in memory (M) or by calculation when direct torque control over the generator 21 is not desired.

In the above-described inner and outer control loops 12I and 12O, as further explained below with reference to FIGS. 2A and 2B, the ECM 50 may limit the engine torque command (arrow $CC_T$) to be within acceptable levels for a given operating speed. For instance, a power limit of the generator 21 at a given operating temperature may be used to calculate a maximum possible generator torque under such conditions. In the outer control loop 12O, the engine torque command (arrow $CC_T$) and torque feedback term (arrow $T_G$), as well as a control transfer function representing the PI or PID function of the controller 18, are used to generate voltage set points for the generator 21, limited to within acceptable range such as 12.5-15.5 VDC.

Figure 2A:
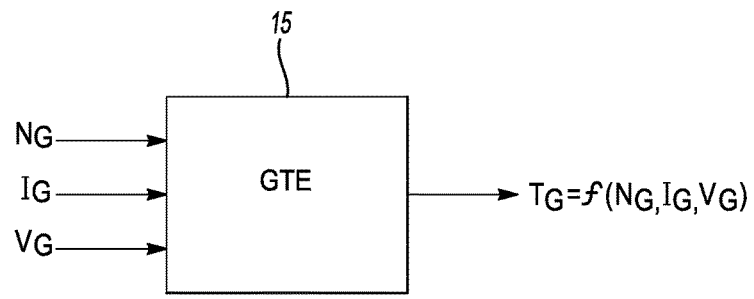
FIGS. 2A and 2B are example logic flow diagrams providing torque estimation logic for use in the engine-driven generator system of FIG. 1.
Figure 2B:
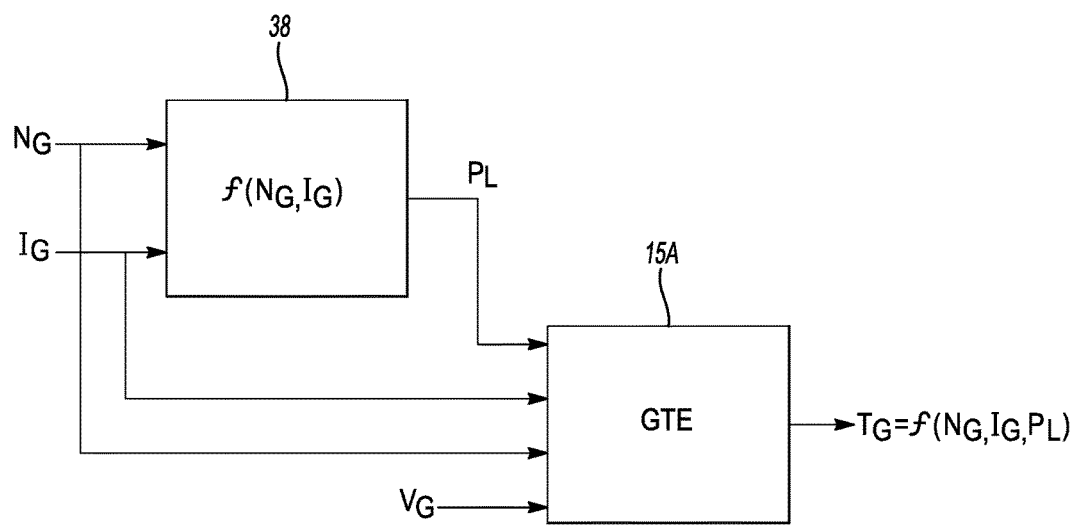

FIGS. 2A and 2B illustrate possible approaches to implementing a torque estimation process using the generator torque estimator (GTE) logic block 15 of FIG. 1. Here, inputs to logic block 15 include the generator speed (arrow $N_G$), generator current (arrow $I_G$), and generator output voltage (arrow $V_G$). The coefficients used in a predetermined polynomial function, $T_G = f(N_G, I_G, V_G)$, for estimated generator torque may be obtained offline, e.g., through regression analysis of the collected set of data from the electric generator 21. Thus, while the initially-obtained data may be temperature dependent, once a "best fit" of the data has been determined over multiple temperatures using regression analysis techniques, later real-time estimation of the generator torque or torque feedback term ($T_G$) is temperature-independent, i.e., the torque-based voltage control signal (arrow $V_{CT}$) is provided independently of a temperature of the system 12 or the surrounding ambient.

In the example embodiment of FIG. 2A, the predetermined polynomial function noted above may be represented as:

$$T_G = \frac{[A + B \cdot N_G + C \cdot N_G^2] + [(D + E \cdot I_G + F \cdot I^2 G) \cdot (1 + G \cdot V_G)]}{N_G}$$

Here, the plurality of polynomial coefficients (A-G) are initially obtained through regression of the measured input data $N_G$, $I_G$, and $V_G$ over different temperatures, and henceforth, the above formula may be used to calculate the generator torque in real-time, i.e., during operation of the system 12, without requiring ambient or system-based temperature data.

FIG. 2B illustrates an alternative approach to the polynomial embodiment of FIG. 2A. The embodiment of FIG. 2B feeds the generator speed (arrow $N_G$) and the filtered generator current (arrow $I_G$) into a loss function logic block 38, labeled $f(N_G, I_G)$, where as with FIG. 2A, the coefficients in the polynomial function are obtained through regression of the generator loss data measured offline. The loss function logic block 38 outputs the generator power loss (arrow $P_L$) to the GTE logic block 15A. The GTE logic block 15A additionally receives the filtered DC bus voltage or generator output voltage ($V_G$). The GTE logic block 15A then uses the filtered output voltage ($V_G$) and calculated loss value ($P_L$) from the loss function logic block 38, at present operating conditions, to calculated the generator torque/torque feedback term ($T_G$) as a function of generator speed, current, and power loss, represented in FIG. 2B as $T_G = f(N_G, I_G, P_L)$. For instance, the GTE 15A may use the following formula:

$$T_G = \frac{[(V_G \cdot I_{DC}) + P_L] \cdot 60}{2\pi \cdot N_G}$$

By the coordinated use of the combined respective inner and outer control loops 12I and 12O as described above, a control methodology is enabled for a synchronous electric generator, such as the generator 21 of FIG. 1, which allows such a device to operate in either a torque-controlled mode or a voltage-controlled mode, or both, over a predefined operating speed range while still maintaining a DC bus voltage within acceptable limits. For instance, the ECM 50 may be configured to selectively disable or bypass the outer control loop 12O during a charging operation of the energy storage device 29, or to selectively enable the outer control loop 12O during coasting or braking maneuvers of the vehicle 10 of FIG. 1.

In the disclosed embodiments, the engine torque command (arrow $CC_T$) may be received from a designated powertrain controller, such as the ECM of FIG. 1, with torque feedback received from a real-time torque estimator, e.g., the GTE 15 or GTE 15A of FIGS. 2A and 2B, respectively. GTEs 15 and 15A may use predetermined polynomial functions to estimate the generator torque, or such logic blocks may use lookup tables, modeling, or other suitable approaches without departing from the intended inventive scope.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and sub-combinations of the preceding elements and features.

What is claimed is:

1. An engine-driven generator system comprising:
   an internal combustion engine;
   a generator assembly coupled to and driven via the engine, and having an electric generator, field windings, and a voltage rectifier collectively producing a direct current (DC) generator output voltage;
   a DC voltage bus connected to the voltage rectifier and having an electrical potential that is equal to the generator output voltage; and
   a controller having an inner control loop configured to input a field duty cycle signal to the field windings in response to an adjusted voltage control signal, and an outer control loop providing a torque-based voltage control signal as an input to the inner control loop in response to a commanded engine torque and an estimated generator torque, such that an output torque of the electric generator is directly controlled via operation of the outer control loop;
   wherein the inner control loop is configured to calculate the adjusted voltage control signal as a difference between the torque-based voltage control signal and the generator output voltage.

2. The system of claim 1, wherein the outer control loop is configured to estimate the estimated generator torque as a function of the generator output voltage and a generator current and generator speed of the electric generator.

3. The system of claim 2, wherein the controller is configured to estimate the estimated generator torque using a predetermined polynomial function having a plurality of temperature-independent coefficients.

4. The system of claim 3, wherein the controller is configured to estimate the estimated generator torque using a loss function logic block outputting a generator power loss value, the polynomial function being a function of the generator output voltage, the generator current, and generator power loss value.

5. The system of claim 2, wherein the outer control loop is configured to calculate the generator speed by multiplying a speed of the engine by a calibrated ratio relating the speed of the engine to the generator speed.

6. The system of claim 1, wherein the engine is selectively connected to a transmission via a torque converter having a torque converter clutch, and wherein the outer control loop is configured to calculate the commanded engine torque using a speed of the engine, a gear state of the transmission, and an applied/released state of the torque converter clutch.

7. The system of claim 4, wherein the transmission and the engine are part of a powertrain of a motor vehicle, and wherein the outer control loop is further configured to calculate the commanded engine torque using a speed of the vehicle and brake and accelerator pedal positions of the motor vehicle.

8. The system of claim 1, further comprising an energy storage device connected to the DC voltage bus, wherein the controller is configured to selectively disable or bypass the outer control loop during a charging operation of the energy storage device.

9. The system of claim 1, wherein the outer control loop is configured to provide the torque-based voltage control signal as an input to the inner control loop independently of a temperature of the system.

10. The system of claim 1, wherein the voltage rectifier is a passive diode bridge rectifier or an active bridge rectifier using MOSFET switches.

11. A method for controlling an engine-driven generator system having a generator assembly that includes an electric generator coupled to and driven via the engine, the method comprising:
    commanding, via an outer control loop of the controller, a torque-based voltage control signal as an input to an inner control loop of the controller in response to a commanded engine torque and an estimated generator torque;
    calculating an adjusted voltage control signal via the inner control loop of the controller as a difference between the torque-based voltage control signal and an output voltage of the electric generator; and
    commanding, via the inner control loop of the controller, a field duty cycle signal to field windings of the electric generator in response to the adjusted voltage control signal;
    wherein the output torque of the electric generator is directly controlled via operation of the outer control loop.

12. The method of claim 11, further comprising: estimating the estimated generator torque via the outer control loop as a function of the generator output voltage and each of a generator current and a generator speed of the electric generator.

13. The method of claim 12, further comprising: estimating the estimated generator torque in real-time operation of the system, via the outer control loop, using a predetermined polynomial function having a plurality of temperature-independent coefficients.

14. The method of claim 13, further comprising: estimating the estimated generator torque using a loss function logic block that outputs a generator power loss value, wherein the polynomial function is a function of the generator output voltage, the generator current, and generator power loss value.

15. The method of claim 12, further comprising: calculating the generator speed by multiplying a speed of the engine by a calibrated ratio relating the speed of the engine to the generator speed.

16. The method of claim 11, wherein the engine is selectively connected to a transmission via a torque converter having a torque converter clutch applied/released state, the method further comprising: calculating the commanded engine torque, via the outer control loop, using a speed of the engine, a gear state of the transmission, and the applied/released state.

17. The method of claim 16, wherein the transmission and the engine are part of a powertrain of a motor vehicle, the method further comprising: calculating the commanded engine torque using a speed of the vehicle and brake and accelerator pedal positions of the motor vehicle.

18. The method of claim 11, wherein the system further includes an energy storage device connected to the DC voltage bus, the method further comprising: selectively disabling or bypassing the outer control loop during a charging operation of the energy storage device.

19. The method of claim 11, further comprising: commanding the torque-based voltage control signal as an input to the inner control loop independently of a temperature of the system.

* * * * *